(12) United States Patent
Zhang et al.

(10) Patent No.: US 11,653,134 B2
(45) Date of Patent: May 16, 2023

(54) ACOUSTIC OUTPUT APPARATUS

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/320,255

(22) Filed: May 14, 2021

(65) Prior Publication Data

US 2021/0274278 A1    Sep. 2, 2021

Related U.S. Application Data

(63) Continuation of application No. PCT/CN2019/130886, filed on Dec. 31, 2019.

(30) Foreign Application Priority Data

Apr. 30, 2019 (CN) .......................... 201910364346.2
Sep. 19, 2019 (CN) .......................... 201910888067.6
Sep. 19, 2019 (CN) .......................... 201910888762.2

(51) Int. Cl.
*H04R 1/10*    (2006.01)
*H04R 1/02*    (2006.01)
(Continued)

(52) U.S. Cl.
CPC .......... *H04R 1/1016* (2013.01); *G02C 11/00* (2013.01); *G02C 11/10* (2013.01); *G06F 3/16* (2013.01);
(Continued)

(58) Field of Classification Search
CPC .......... H04R 1/227; H04R 1/26; H04R 1/403; H04R 1/24; H04R 1/1008; H04R 1/1075;
(Continued)

(56) References Cited

U.S. PATENT DOCUMENTS 9,838,787 B1 * 12/2017 Jeffery ................. H04R 1/1091
2012/0177206 A1    7/2012 Yamagishi et al.
(Continued)

FOREIGN PATENT DOCUMENTS

CN    105554658 A    5/2016

OTHER PUBLICATIONS

International Search Report in PCT/CN2019/130886 dated Mar. 31, 2020, 6 pages.
(Continued)

*Primary Examiner* — Ahmad F. Matar
*Assistant Examiner* — Sabrina Diaz
(74) *Attorney, Agent, or Firm* — Metis IP LLC

(57) ABSTRACT

The present disclosure relates to an acoustic output apparatus including a first acoustic driver for outputting sounds within a first frequency range via a plurality of first sound guiding holes and a second acoustic driver for outputting sounds within a second frequency range via a plurality of second sound guiding holes. The sounds output via the plurality of first sound guiding holes may radiate to the environment and form a leaked sound. The acoustic output apparatus may further include a support structure configured to support the first acoustic driver and the second acoustic driver such that the plurality of sound guiding holes are located at positions away from a user's ear. The sounds output via the plurality of second sound guiding holes may interfere with the leaked sound in an overlapping frequency range between the second frequency range and the first frequency range to reduce the leaked sound.

20 Claims, 9 Drawing Sheets

(51) Int. Cl.
| | |
|---|---|
| H04R 1/26 | (2006.01) |
| H04R 1/44 | (2006.01) |
| G06F 3/16 | (2006.01) |
| H04M 1/03 | (2006.01) |
| H04M 1/78 | (2006.01) |
| H04R 1/24 | (2006.01) |
| H04R 1/28 | (2006.01) |
| H04R 3/02 | (2006.01) |
| H04R 1/34 | (2006.01) |
| H04W 4/80 | (2018.01) |
| H04R 1/22 | (2006.01) |
| H04R 3/00 | (2006.01) |
| H04R 5/02 | (2006.01) |
| G10L 21/038 | (2013.01) |
| H04R 5/033 | (2006.01) |
| H04S 7/00 | (2006.01) |
| G02C 11/00 | (2006.01) |
| H04R 1/38 | (2006.01) |
| H04R 9/06 | (2006.01) |
| G10L 21/0208 | (2013.01) |
| G02C 11/06 | (2006.01) |
| G10L 21/0216 | (2013.01) |

(52) U.S. Cl.
CPC ............ *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/105* (2013.01); *H04R 1/1008* (2013.01); *H04R 1/1025* (2013.01); *H04R 1/1041* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC ........ H04R 1/225; H04R 1/1016; H04R 1/02; H04R 1/026; H04R 1/028; H04R 1/10; H04R 1/1025; H04R 1/1041; H04R 1/105; H04R 1/1083; H04R 1/22; H04R 1/245; H04R 1/28; H04R 1/2803; H04R 1/2807; H04R 1/2811; H04R 1/2896; H04R 1/34; H04R 1/342; H04R 1/345; H04R 1/347; H04R 1/38; H04R 3/12; H04R 3/005; H04R 3/00; H04R 3/02; H04R 5/02; H04R 5/033; H04R 5/0335; H04R 2410/07; H04R 2410/05; H04R 9/063; H04R 9/06; H04R 2201/103; G10L 21/0208; G10L 21/038; G10L 2021/02165; G10L 2021/02166; G11B 20/24; H04W 4/80; G02C 11/00; G02C 11/10; G02C 11/06; G06F 3/16; G06F 3/162; G06F 3/165; H04M 1/03; H04M 1/035; H04M 1/78; H04S 7/304; H04S 2400/11
USPC .................................. 381/94.1, 182, 373, 89
See application file for complete search history.

(56) References Cited

U.S. PATENT DOCUMENTS

2017/0201823 A1* 7/2017 Shetye ................ H04R 1/347
2017/0353793 A1* 12/2017 Sun ......................... H04R 3/04

OTHER PUBLICATIONS

Written Opinion in PCT/CN2019/130886 dated Mar. 31, 2020, 8 pages.

\* cited by examiner

ACOUSTIC OUTPUT APPARATUS

CROSS-REFERENCE TO RELATED APPLICATION

This application is a Continuation of International Application No. PCT/CN2019/130886, filed on Dec. 31, 2019, which claims priority of Chinese Patent Application No. 201910364346.2 filed on Apr. 30, 2019, Chinese Patent Application No. 201910888067.6 filed on Sep. 19, 2019, and Chinese Patent Application No. 201910888762.2 filed on Sep. 19, 2019, the contents of each of which are hereby incorporated by reference in its entirety.

TECHNICAL FIELD

The present disclosure relates to the field of acoustics, and more specifically relates to an acoustic output apparatus.

BACKGROUND

An open-ear acoustic output apparatus is a portable acoustic output apparatus that realizes sound conduction in a specific range. Compared with traditional in-ear and over-ear headphones, the open-ear acoustic output apparatus has characteristics of not blocking or covering an ear canal, which may allow a user to obtain sound information in external environment while listening to music, thereby improving the safety and the comfort level. Due to an open structure, a leaked sound of the open-ear acoustic output apparatus is more serious than that of a traditional earphone. Generally, two or more sound sources are used to construct a specific sound field and adjust a sound pressure distribution to reduce the leaked sound, which can reduce the leaked sound to a certain extent, but there are still certain limitations. For example, a volume of the sound sent to the user may be reduced while the leaked sound is suppressed. In addition, because sounds at different frequencies have different wavelengths, the suppression effect of the leaked sound at high-frequency is not good.

Therefore, it is desirable to provide an acoustic output apparatus that can simultaneously increase a volume of the sound heard by the user and reduce the leaked sound.

SUMMARY

One aspect of the present disclosure provides an acoustic output apparatus. The acoustic output apparatus may include a first acoustic driver, a second acoustic driver, and a support structure. The first acoustic driver may output sounds within a first frequency range via a plurality of first sound guiding holes. The sounds output via the plurality of first sound guiding holes may radiate to the environment and form a leaked sound. The second acoustic driver may output sounds within a second frequency range via a plurality of second sound guiding holes. The second frequency range and the first frequency range may overlap. The support structure may be configured to support the first acoustic driver and the second acoustic driver such that the plurality of first sound guiding holes and the plurality of second sound guiding holes are located at positions away from an ear of a user. The sounds output via the plurality of second sound guiding holes may interfere with the leaked sound in an overlapping frequency range between the second frequency range and the first frequency range. The interference may reduce the leaked sound.

In some embodiments, the sounds output via the plurality of first sound guiding holes may have a first phase difference. The sounds output via the plurality of second sound guiding holes may have a second phase difference. An absolute value of the first phase difference may be within a range from 160 degrees to 180 degrees. An absolute value of the second phase difference may be within a range from 160 degrees to 180 degrees.

In some embodiments, a pair of first sound guiding holes of the plurality of first sound guiding holes may be spaced from each other by a first distance. A pair of second sound guiding holes of the plurality of second sound guiding holes may be spaced from each other by a second distance. The first distance may be greater than the second distance.

In some embodiments, the first distance may be at least 1.1 times more than the second distance.

In some embodiments, the plurality of first sound guiding holes may include a far-ear sound guiding hole farther from the ear of the user among the plurality of first sound guiding holes. The plurality of second sound guiding holes points may include a near-ear sound guiding hole closer to the ear of the user among the plurality of second sound guiding holes. A connection line between the far-ear sound guiding hole and the near-ear sound guiding hole is directed to an area where the ear of the user is located.

In some embodiments, an included angle between the connection line and a connection line of the plurality of first sound guiding holes may not be greater than 90 degrees.

In some embodiments, an included angle between the connection line and a connection line of the plurality of second sound guiding holes may not be greater than 90 degrees.

In some embodiments, the plurality of first sound guiding holes may include a near-ear sound guiding hole closer to the ear of the user among the plurality of first sound guiding holes. The plurality of second sound guiding holes may include a near-ear sound guiding hole closer to the ear of the user among the plurality of second sound guiding holes. A sound output via the near-ear sound guiding hole of the plurality of first sound guiding holes and a sound output via the near-ear sound guiding hole of the plurality of second sound guiding holes may have a third phase difference.

In some embodiments, an absolute value of the third phase difference may be within a range of 0 degrees to 10 degrees. The absolute value of the third phase difference may be within a range of 160 degrees to 180 degrees.

In some embodiments, the first frequency range may include frequencies lower than 650 Hz and the second frequency range may include frequencies higher than 1000 Hz.

In some embodiments, the first frequency range may include frequencies lower than the frequencies in the second frequency range.

In some embodiments, the second frequency range may include frequencies higher than the frequencies in the first frequency range.

In some embodiments, the first acoustic driver may include a first transducer for generating the sounds output via the plurality of first sound guiding holes. The second acoustic driver may include a second transducer for generating the sounds output via the plurality of second sound guiding holes.

In some embodiments, the first transducer and the second transducer may have different frequency response characteristics.

In some embodiments, the first transducer and the second transducer may have the same frequency response characteristic.

In some embodiments, the first acoustic driver may include a plurality of transducers. Each of the plurality of transducers may be configured to generate the sound output via one of the plurality of first sound guiding holes.

In some embodiments, the acoustic output apparatus may further include a controller configured to control the frequency range of the sounds output by the first acoustic driver and/or the second acoustic driver.

BRIEF DESCRIPTION OF THE DRAWINGS

The present disclosure is further described in terms of exemplary embodiments. These exemplary embodiments are described in detail with reference to the drawings. These embodiments are not restrictive. In these embodiments, the same number represents the same structure, wherein.

DETAILED DESCRIPTION

Figure 1:
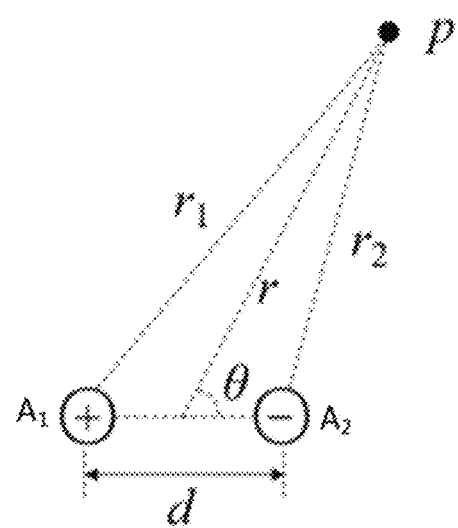
FIG. 1 is a schematic diagram illustrating exemplary two point sources according to some embodiments of the present disclosure.

In order to illustrate the technical solutions related to the embodiments of the present disclosure, a brief introduction of the drawings referred to in the description of the embodiments is provided below. Drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" are used herein to distinguish different components, elements, parts, sections, or assemblies of different levels. However, if other expressions may achieve the same purpose, the terms may be replaced by the other expressions.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

The present disclosure provides an acoustic output apparatus. When a user wears the acoustic output apparatus, the acoustic output apparatus may be at least located on a side of a head of the user, close to but not blocking ears of the user. The acoustic output apparatus may be worn on the head of the user (e.g., using glasses, headbands, or other structures) or other body portions (e.g., a neck/shoulder area) of the user, or placed near the ears of the user by other manners (e.g., handheld by the user). The acoustic output apparatus may include a first acoustic driver and a second acoustic driver. The first acoustic driver may output a sound within a first frequency range from a plurality of first sound guiding holes. The second acoustic driver may output a sound within a second frequency range from a plurality of second sound guiding holes. The first frequency range and the second frequency range may overlap. In some embodiments, the sound output from the plurality of second sound guiding holes may interfere with the sound output from the plurality of first sound guiding holes in the overlapping frequency range. The interference may reduce a leaked sound emitted by the acoustic output apparatus to environment.

In order to further explain the effect of the setting of the sound guiding holes on the acoustic output apparatus on a sound output effect of the acoustic output apparatus, and considering that the sound may be regarded as propagating outwards from the sound guiding holes, the present disclosure may describe sound guiding holes on an acoustic output apparatus as sound sources for externally outputting sound.

Just for the convenience of description and for the purpose of illustration, when sizes of the sound guiding holes on the acoustic output apparatus are small, each sound guiding hole may be approximately regarded as a point source (also referred to as a point sound source). In some embodiments, any sound guiding hole provided on the acoustic output apparatus for outputting sound may be approximated as a single point source on the acoustic output apparatus. A sound field pressure p generated by a single point source may satisfy Equation (1):

$$p = \frac{j\omega\rho_0}{4\pi r}Q_0\exp j(\omega t - kr), \qquad (1)$$

where w denotes an angular frequency, $\rho_0$ denotes an air density, r denotes a distance between a target point and the point source, $Q_0$ denotes a volume velocity of the point source, and k denotes wave number. It may be concluded that a magnitude of the sound field pressure of the point source at the target point is inversely proportional to the distance between the target point to the point source.

It should be noted that the sound guiding holes for outputting sound as point sources may only serve as an explanation of the principle and effect of the present disclosure, and may not limit the shapes and sizes of the sound guiding holes in practical applications. In some embodiments, if an area of a sound guiding hole is large enough, the sound guiding hole may also be equivalent to a planar acoustic source. In some embodiments, the point source may also be realized by other structures, such as a vibration surface and a sound radiation surface. For those skilled in the art, without creative activities, it may be known that sounds produced by structures such as a sound guiding hole, a vibration surface, and an acoustic radiation surface may be similar to a point source at a spatial scale discussed in the present disclosure, and may have similar sound propagation characteristics and the similar mathematical description manner. Further, for those skilled in the art, without creative activities, it may be known that the acoustic effect achieved by "an acoustic driver may output sound from at least two first sound guiding holes" described in the present disclosure may also achieve the same effect by other acoustic structures, for example, "at least two acoustic drivers each may output sound from at least one acoustic radiation surface." According to actual situations, other acoustic structures may be selected for adjustment and combination, and the same acoustic output effect may also be achieved. The principle of radiating sound outward with structures such as surface sound sources may be similar to that of point sources, and may not be repeated here.

In some embodiments, the acoustic output apparatus provided in the present disclosure may include a plurality of acoustic drivers. Each acoustic driver may export the sound generated by the acoustic driver through one or more sound guiding holes coupled with the acoustic driver. For convenience, the sound output from the acoustic output apparatus to the surrounding environment may be referred to as a far-field leakage since it can be heard by others in the environment. The sound output from the acoustic output apparatus to the ears of the user wearing the acoustic output apparatus may be referred to as a near-field sound since a distance between the acoustic output apparatus and the user is relatively short. In some embodiments, sounds output from two sound guiding holes (i.e., two point sources) coupled with a same acoustic driver may have a certain phase difference. When a distance between the two point sources, the phase difference of the sounds output from the two point sources, and amplitudes of the sounds meet a certain condition, the acoustic output apparatus may output different sound effects in the near field (for example, a position of the user's ear) and the far-field. For example, if the phases of the two point sources corresponding to the two sound guiding holes are opposite, that is, an absolute value of the phase difference between the two point sources is 180 degrees, the far-field leakage may be reduced according to the principle of reversed phase cancellation. In some embodiments, two acoustic drivers may simultaneously generate the sounds in the same frequency range. In the same frequency range, the plurality of sound guiding holes coupled with the two acoustic drivers may be equivalent to a plurality of point sources for externally outputting sound.

In such cases, when the plurality of point sources satisfy a specific relationship, the sound effect of the acoustic output apparatus may be further improved.

FIG. 1 is a schematic diagram illustrating exemplary two point sources according to some embodiments of the present disclosure.

As shown in FIG. 1, a sound field pressure p generated by the two point sources may satisfy Equation (2):

$$p = \frac{A_1}{r_1} \exp j(\omega t - kr_1 + \varphi_1) + \frac{A_2}{r_2} \exp j(\omega t - kr_2 + \varphi_2), \quad (2)$$

where $A_1$ and $A_2$ denote intensities of the two point sources, $\varphi_1$ and $\varphi_2$ denote phases of the two point sources, respectively, d denotes a distance between the two point sources, and $r_1$ and $r_2$ may satisfy Equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad (3)$$

where r denotes a distance between a target point in the space and a center of the two point sources, and θ indicates an angle between a line connecting the target point and the center of the two point sources and a line on which the two point source is located.

It may be concluded from Equation (3) that a magnitude of the sound pressure p at the target point in the sound field may relate to the intensity of each point source, the distance d, the phase of each point source, and the distance r.

Point sources with different output effects may be achieved by different settings of sound guiding holes, such that the acoustic output apparatus may increase a volume of the near-field sound and reduce the far-field leakage. For example, an acoustic driver with two point sources may include a vibration diaphragm. When the vibration diaphragm vibrates, sounds may be transmitted from the front and rear sides of the vibration diaphragm, respectively. The front side of the vibration diaphragm in the acoustic output apparatus may be provided with a front chamber for transmitting sound. The front chamber may be coupled with a sound guiding hole acoustically. The sound on the front side of the vibration diaphragm may be transmitted to the sound guiding hole through the front chamber and further transmitted outwards. The rear side of the vibration diaphragm in the acoustic output apparatus may be provided with a rear chamber for transmitting sound. The rear chamber may be coupled with another sound guiding hole acoustically. The sound on the rear side of the vibration diaphragm may be transmitted to the sound guiding hole through the rear chamber and propagate further outwards. It should be noted that, when the vibration diaphragm is vibrating, the front side and the rear side of the vibration diaphragm may generate sounds with opposite phases. In some embodiments, the structures of the front chamber and rear chamber may be specially set so that the sound output by the acoustic driver at different sound guiding holes may meet a specific condition. For example, lengths of the front chamber and rear chamber may be specially designed such that sounds with a specific phase relationship (e.g., opposite phases) may be output at the two sound guiding holes.

A sound guiding hole may be a small hole formed on the acoustic output apparatus with a specific opening and allowing sound to pass. a circle shape, an oval shape, a square shape, a trapezoid shape, a rounded quadrangle shape, a triangle shape, an irregular shape, or the like, or any combination thereof. In some embodiments, the number of the sound guiding holes of the acoustic output apparatus (e.g., an acoustic output apparatus 100, an acoustic output apparatus 200) may be an arbitrary value.

Figure 2:
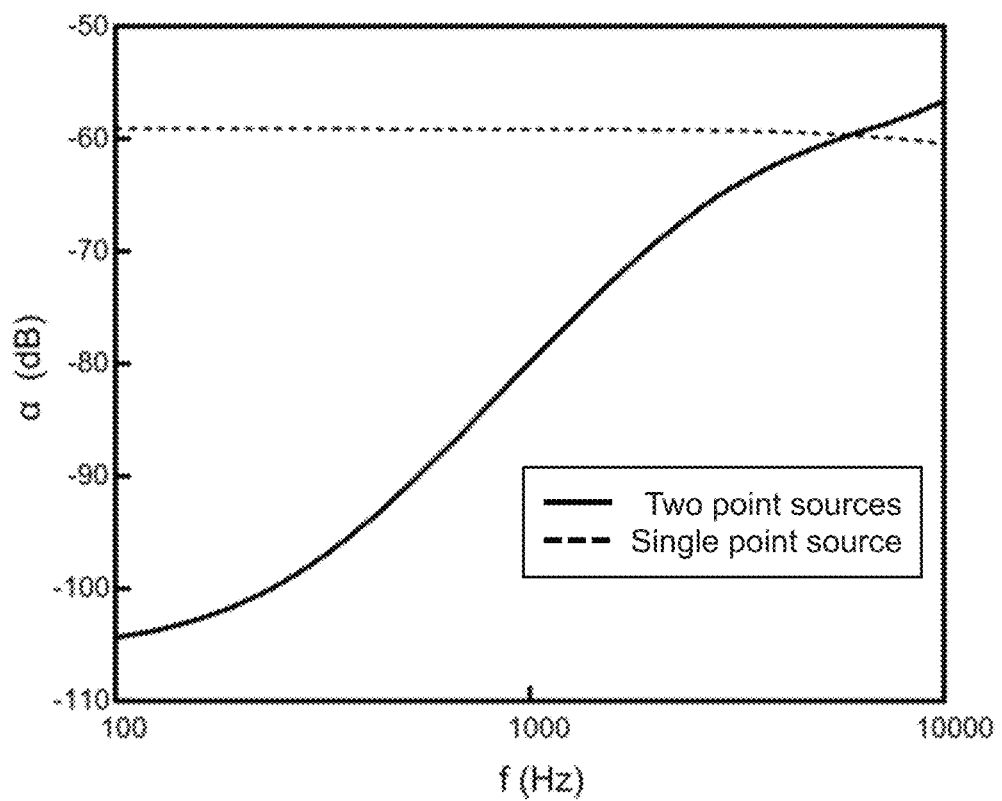
FIG. 2 is a schematic diagram illustrating a variation of a leaked sound of two point sources and a single point source along with frequency according to some embodiments of the present disclosure.

FIG. 2 is a schematic diagram illustrating variations of sound leakages of two point sources and a single point source along with frequency according to some embodiments of the present disclosure.

Under certain conditions, compared to a volume of a far-field leakage of a single point source, a volume of a far-field leakage of two point sources may increase with the frequency. In other words, a leakage reduction capability of the two point sources in the far-field may decrease with the frequency increases. For further description, a curve illustrating a relationship between a far-field leakage and a frequency may be described in connection with FIG. 2.

A distance between the two point sources in FIG. 2 may be fixed, and the two point sources may have a substantially same amplitude and opposite phases. The dotted line may indicate a variation curve of a volume of a leaked sound of the single point source at different frequencies. The solid line may indicate a variation curve of a volume of a leaked sound of the two point sources at different frequencies. The abscissa of the diagram may represent the sound frequency (f), and the unit of the sound frequency (f) may be Hertz (Hz). The ordinate of the diagram may use a normalization parameter a to evaluate the volume of a leaked sound. The parameter a may be determined according to Equation (4):

$$\alpha = \frac{|P_{far}|^2}{|P_{ear}|^2}, \qquad (4)$$

where $P_{far}$ represents a sound pressure of the acoustic output apparatus in the far-field (i.e., a sound pressure of the far-field sound leakage). $P_{ear}$ represents a sound pressure around the user's ears (i.e., a sound pressure of the near-field sound). The larger the value of a, the larger the far-field leakage relative to the near-field sound heard will be, indicating that a poorer capability of the acoustic output apparatus for reducing the far-field leakage.

As shown in FIG. 2, when the frequency is below 6000 Hz, the far-field leakage produced by the two point sources may be less than the far-field leakage produced by the single point source, and may increase as the frequency increases. When the frequency is close to 10000 Hz (for example, about 8000 Hz or above), the far-field leakage produced by the two point sources may be greater than the far-field leakage produced by the single point source. In some embodiments, according to the above content, a frequency corresponding to an intersection of the variation curves of the two point sources and the single point source may be determined as an upper limit frequency that the two point sources are capable of reducing a sound leakage.

For illustration purposes, when the frequency is relatively small (for example, in a range of 100 Hz-1000 Hz), the capability to reduce a sound leakage of the two point sources may be strong (e.g., below −80 dB) (i.e., the value of a is small). In such a frequency band, an increase of the volume of the sound heard by the user may be determined as an optimization goal. When the frequency is larger (for example, in a range of 1000 Hz-8000 Hz), the capability to reduce a sound leakage of the two point sources may be weak (e.g., above −80 dB). In such a frequency band, a decrease of the sound leakage may be determined as the optimization goal.

According to FIG. 2, it may be possible to determine a frequency division point based on the variation tendency of the two point sources' capability to reduce a sound leakage. Parameters of the two point sources may be adjusted according to the frequency division point so as to reducing the sound leakage of the acoustic output apparatus. For example, the frequency corresponding to a of a specific value (for example, −60 dB, −70 dB, −80 dB, −90 dB, etc.) may be used as the frequency division point. Parameters of the two point sources may be determined to improve the near-field sound in a frequency band below the frequency division point, and/or to reduce the far-field sound leakage in a frequency band above the frequency division point. In some embodiments, a high-frequency band with a high frequency (for example, a sound output from a high-frequency acoustic driver) and a low-frequency band with a low frequency (for example, a sound output from a low-frequency acoustic driver) may be determined based on the frequency division point.

In some embodiments, a manner for measuring and determining the sound leakage may be adjusted according to the actual conditions. For example, a plurality of points on a spherical surface centered by a center point of the two point sources with a radius of r (for example, 40 centimeters) may be identified, and an average value of amplitudes of the sound pressure at the plurality of points may be determined as the value of the sound leakage. As another example, one or more points of the far-field may be taken as one or more positions for measuring the sound leakage, and a sound volume or an average sound volume at the one or more positions may be taken as the value of the sound leakage. As a further example, a center of the two point sources may be used as a center of a circle at the far-field, and sound pressure amplitudes of two or more points evenly distributed at the circle selected according to a certain spatial angle may be averaged as the value of the sound leakage. These manners may be adjusted by those skilled in the art according to actual conditions, which may be limited herein.

At a certain sound frequency, if the distance between the two point sources changes, its capability to reduce a sound leakage may be changed, and the difference between volume of the sound heard by the user (also referred to as "heard sound") and volume of the leaked sound may also be changed. For a better description, a curve of a far-field leakage along with the distance between the two point sources may be described with reference to FIGS. 3A and 3B.

Figure 3A:
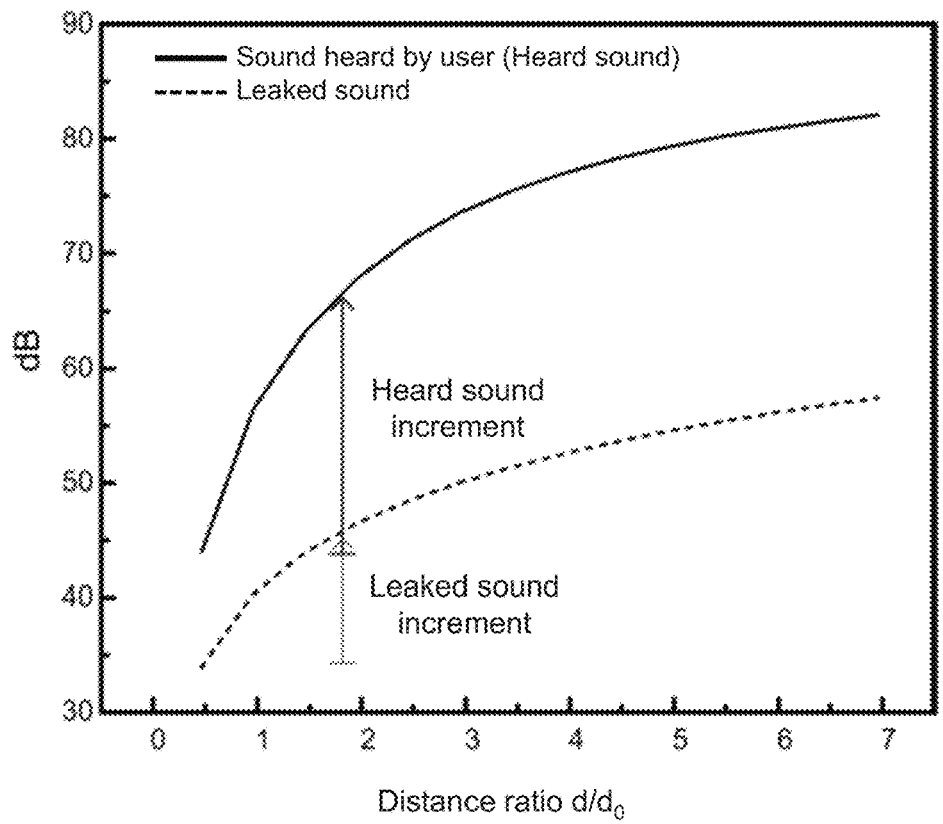
FIGS. 3A-3B are schematic diagrams illustrating a volume of a near-field sound and a volume of a far-field leakage along with a distance of two point sources according to some embodiments of the present disclosure.
Figure 3B:
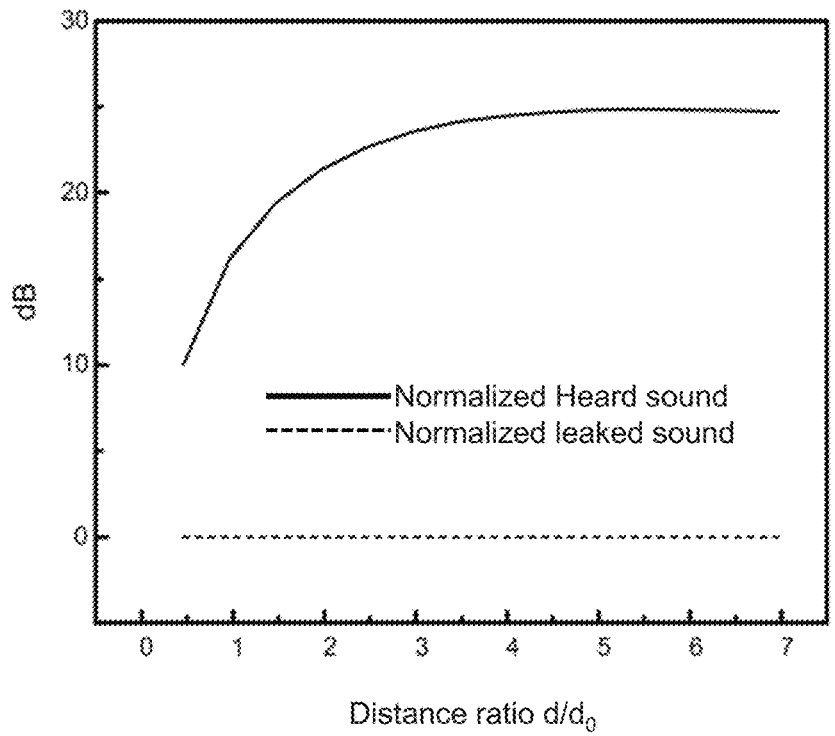

FIGS. 3A-3B are schematic diagrams illustrating a volume of a near-field sound and a volume of a far-field leakage along with a distance of two point sources according to some embodiments of the present disclosure. FIG. 3B may be generated by performing a normalization on the graph in FIG. 3A.

In FIG. 3A, a solid line may represent a variation curve of the volume of the two point sources along with the distance between the two point sources, and the dotted line may represent the variation curve of the volume of the leaked sound of the two point sources along with the distance between the two point sources. The abscissa may represent a distance ratio d/d0 of the distance d of the two point sources to a reference distance d0. The ordinate may represent a sound volume (the unit is decibel dB). The distance ratio d/d0 may reflect a variation of the distance between the two point sources. In some embodiments, the reference distance d0 may be selected within a specific range. For example, d0 may be a specific value in the range of 2.5 mm-10 mm, e.g., d0 may be 5 mm. In some embodiments, the reference distance d0 may be determined based on a listening position. For example, the distance between the listening position to the nearest point source may be taken as the reference distance d0. It should be known that the reference distance d0 may be flexibly selected from any other suitable values according to the actual conditions, which is not limited here. Merely by way of example, in FIG. 3A, d0 may be 5 mm.

When the sound frequency is a constant, the volume of the sound heard by the user and the volume of the leaked sound of the two point sources may increase as the distance between the two point sources increases. When the distance ratio d/d0 of is less than a threshold ratio, an increase (or increment) in the volume of the sound heard by the user may be larger than an increase (or increment) in the volume of the leaked sound as the distance between two point sources increases. That is to say, the increase in volume of the sound heard by the user may be more significant than the increase in volume of the leaked sound. For example, as shown in FIG. 3A, when the distance ratio d/d0 is 2, the difference between the volume of the sound heard by the user and the volume of the leaked sound may be about 20 dB. When the distance ratio d/d0 is 4, the difference between the volume of the sound heard by the user and the volume of the leaked sound may be about 25 dB. In some embodiments, when the distance ratio d/d0 reaches the threshold ratio, the ratio of the volume of the sound heard by the user to the volume of the leaked sound of the two point sources may reach a maximum value. At this time, as the distance of the two point sources further increases, the curve of the volume of the sound heard by the user and the curve of the volume of the leaked sound may gradually go parallel, that is, the increase in volume of the sound heard by the user and the increase in volume of the leaked sound may remain substantially the same. For example, as shown in FIG. 3B, when the distance ratio d/d0 is 5, 6, or 7, the difference between the volume of the sound heard by the user and the volume of the leaked sound may remain substantially the same, both of which may be about 25 dB. That is, the increase in volume of the sound heard by the user may be the same as the increase in volume of the leaked sound. In some embodiments, the threshold ratio of the distance ratio d/d0 of the two point sources may be in the range of 0-7. For example, the threshold ratio of d/d0 may be set in the range of 0.5-4.5. As another example, the threshold ratio of d/d0 may be set in the range of 1-4.

In some embodiments, the threshold ratio value may be determined based on the variation of the difference between the volume of the sound heard by the user and the volume of the leaked sound of the two point sources of FIG. 3A. For example, the ratio corresponding to the maximum difference between the volume of the sound heard by the user and the volume of the leaked sound may be determined as the threshold ratio. As shown in FIG. 3B, when the distance ratio d/d0 is less than the threshold ratio (e.g., 4), a curve of a normalized sound heard by the user (also referred to as "normalized heard sound") may show an upward trend (the slope of the curve is larger than 0) as the distance between the two point sources increases. That is, the increase in sound heard by the user volume may be greater than the increase in volume of the leaked sound. When the distance ratio d/d0 is greater than the threshold ratio, the slope of the curve of the normalized sound heard by the user may gradually approach 0 as the distance between the two point sources increases. That is to say, the increase in volume of the sound heard by the user may be no longer greater than the increase in volume of the leaked sound as the distance between the two point sources increases.

Figure 4:
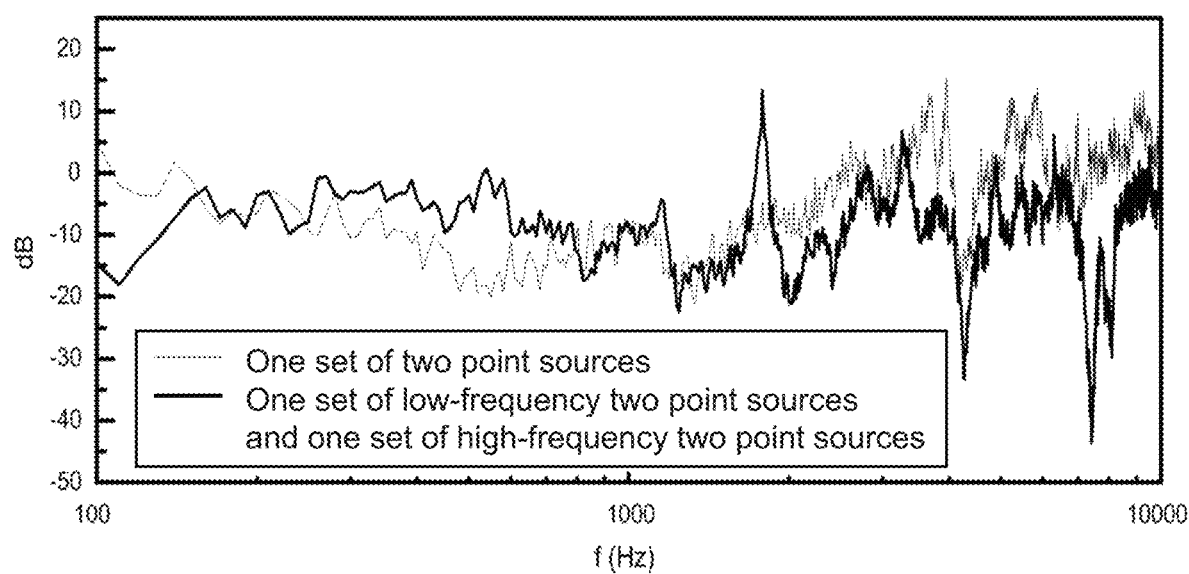
FIG. 4 is a schematic diagram illustrating a variation of a leaked sound of two sets of two point sources and a leaked sound of one set of two point sources along with frequency according to some embodiments of the present disclosure.

FIG. 4 is a schematic diagram illustrating variations of a leaked sound of two sets of two point sources and a leaked sound of one set of two point sources along with frequency according to some embodiments of the present disclosure.

According to FIG. 2, the two point sources may have a weaker capability to reduce a leaked sound in a high-frequency band (the higher-frequency band may be determined based a frequency division point), and a stronger capability to reduce the leaked sound in a low-frequency band (the lower-frequency band may be determined based on the frequency division point). According to FIGS. 3A and 3B, at a certain sound frequency, if a distance between the two point sources changes, its capability to reduce the sound leakage may be changed, and a difference between a volume of the sound heard by the user and a volume of the leaked sound may also be changed. At a certain frequency range, if a count of sets of two point sources of the acoustic output apparatus changes, the capability of the acoustic output apparatus to reduce the leaked sound may vary along with frequency in different ways. For a clearer description, variation curves of the leaked sound of two sets of two point sources and the leaked sound of one set of two point sources along with frequency may be described in connection with FIG. 4.

In FIG. 4, a gray line may represent a variation curve of the leaked sound generated by one set of two point sources along with frequency, and a black line may represent a variation curve of the leaked sound generated by two sets of two point sources (including one set of low-frequency two point sources and one set of high-frequency two point sources) along with frequency. The abscissa may represent a sound frequency, and a unit of the sound frequency may be hertz (Hz). The ordinate may represent a volume of the leaked sound, and a unit of the volume of the leaked sound may be decibels (dB).

An acoustic output apparatus including only one set of two point sources may have a greater capability to reduce the leaked sound in the low-frequency band. For example, in FIG. 4, in a frequency range of 200 Hz to 7000 Hz, the leaked sound generated by the one set of two point sources is smaller than the leaked sound generated by the two sets of two point sources, and the capability to reduce the leaked sound of the one set of two point sources is stronger than the capability to reduce the leaked sound of the two sets of two point sources. But outside of the frequency range of 200 Hz to 7000 Hz, the leaked sound generated by the one set of two point sources may be greater than the leaked sound generated by the two sets of two point sources. In a high-frequency range, the capability to reduce the leaked sound of an acoustic output apparatus that includes two sets of two point sources (e.g., low-frequency two point sources and high-frequency two point sources) may be better than that of an acoustic output apparatus that includes one set of two point sources. For example, as shown in FIG. 4, in a frequency range of 7000 Hz to 10 kHz, a volume of the leaked sound of the two sets of two point sources may be lower than that of the one set of two point sources. It should be seen that, compared with the one set of two point sources, the two sets of two point sources may achieve a better effect of reducing the leaked sound in a wider frequency range.

In some embodiments, if a listening position is fixed, one or more parameters of the two point sources may be adjusted by certain means. Therefore, a volume of a near-field sound may be significantly increased while a volume of a far-field leakage may be only slightly increased (i.e., an increase (or increment) in the volume of the near-field sound may be greater than an increase (or increment) in the volume of the far-field leakage). For example, two or more two point sources (e.g., a set of high-frequency two point sources and a set of low-frequency two point sources) may be set. A distance between the two point sources in each set may be adjusted separately such that a distance between the high-frequency two point sources is smaller than a distance between the low-frequency two point sources. Under a combined effect of the two sets of two point sources, the volume of the sound heard by the user of the acoustic output apparatus may be significantly greater than the volume of the leaked sound, thereby reducing the leaked sound.

In some embodiments, when the above mentioned two sets of two point sources satisfy a certain condition, the effect of reducing the leaked sound of the acoustic output apparatus in a far-field may be further improved. For example, high-frequency two point sources and low-frequency two point sources may jointly output a sound in a certain frequency range. That is, a high-frequency sound output by the high-frequency two point sources and a low-frequency sound output by the low-frequency two point sources may have an overlapping frequency range. In the overlapping frequency range, the sound generated by the high-frequency two point sources and the low-frequency two point sources may be regarded as a sound generated by four point sources (i.e., a sound from four sound guiding holes of the acoustic output apparatus). When the four point sources satisfy a certain condition, for example, when the four point sources has a quadrupole effect, the acoustic output apparatus may simultaneously generate sound heard by the user with a higher volume in a near field and a leaked sound with a lower volume in the far field. The influence of the four point sources on the output sound of the acoustic output apparatus may be further described in FIGS. 5A and 5B.

Figure 5A:
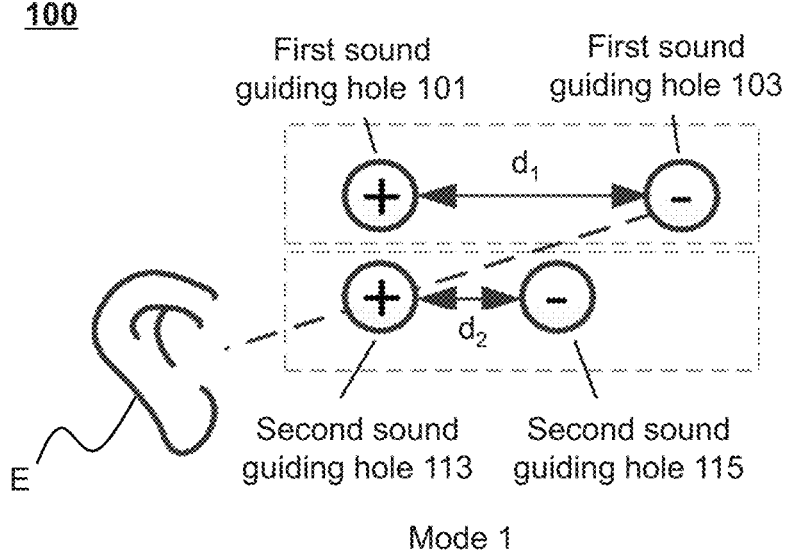
FIGS. 5A-5B are schematic diagrams illustrating four point sources according to some embodiments of the present disclosure.
Figure 5B:
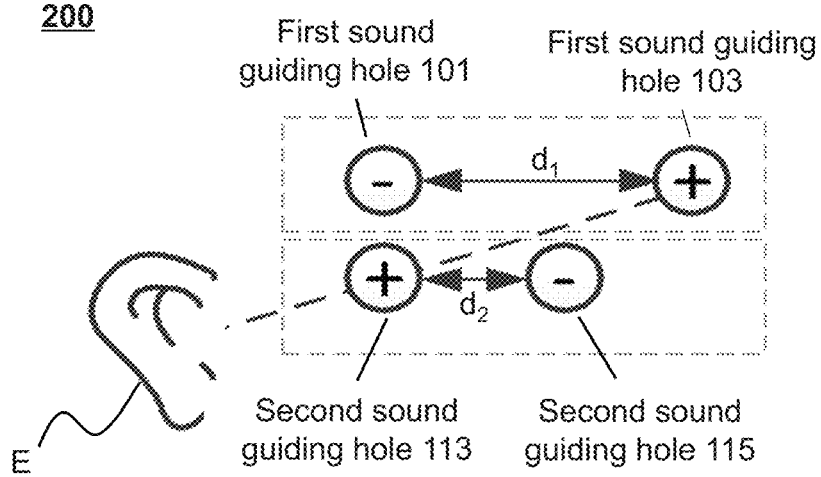

FIGS. 5A-5B are schematic diagrams illustrating four point sources according to some embodiments of the present disclosure.

In FIGS. 5A-5B, symbols "+" and "−" may correspond to phases of sounds generated by sound guiding holes on an acoustic output apparatus. A first sound guiding hole 101 and a first sound guiding hole 103 may correspond to a same acoustic driver, which may be equivalent to a first set of two point sources. A second sound guiding hole 113 and a second sound guiding hole 115 may correspond to a same acoustic driver, which may be equivalent to a second set of two point sources. When the first set of two point sources and the second set of two point sources jointly output sounds with a same frequency, the two sets of two point sources may form four point sources. For illustration purposes, an ear E of a user wearing the acoustic output apparatus is shown in FIGS. 5A-5B.

A first distance $d_1$ may be a distance between the first sound guiding hole 101 and the first sound guiding hole 103. A second distance $d_2$ may be a distance between the second sound guiding hole 113 and the second sound guiding hole 115. In some embodiments, the first distance $d_1$ and the second distance $d_2$ may be any value. The first distance $d_1$ may be greater than the second distance $d_2$. Merely by way of example, the first distance $d_1$ may be not less than 8 millimeters, the second distance $d_2$ may not be larger than 12 millimeters, and the first distance $d_1$ may be greater than the second distance $d_2$. Preferably, the first distance $d_1$ may be not less than 10 millimeters, the second distance $d_2$ may not be larger than 12 millimeters, and the first distance $d_1$ may be greater than the second distance $d_2$. More preferably, the first distance $d_1$ may be not less than 12 millimeters, and the second distance $d_2$ may not be larger than 10 millimeters. More preferably, the first distance $d_1$ may be not less than 15 millimeters, the second distance $d_2$ may not be larger than 8 millimeters. More preferably, the first distance $d_1$ may be not less than 20 millimeters, the second distance $d_2$ may not be larger than 8 millimeters. More preferably, the first distance $d_1$ may be not less than 30 millimeters, the second distance $d_2$ may not be larger than 7 millimeters. More preferably, the first distance $d_1$ may be within a range from 20 millimeters to 40 millimeters, and the second distance $d_2$ may be in a range from 3 millimeters to 7 millimeters. In some embodiments, the first distance $d_1$ may be at least one time more than the second distance $d_2$. Preferably, the first distance $d_1$ may be at least 1.1 times more than the second distance $d_2$. More preferably, the first distance $d_1$ may be at least 1.5 times more than the second distance $d_2$.

In some embodiments, the four sound guiding holes (i.e., the first sound guiding hole 101, the first sound guiding hole 103, the second sound guiding hole 113, and the second sound guiding hole 115) may be arranged on different positions of the acoustic output apparatus. Merely by way of example, the first sound guiding holes (e.g., the first sound guiding hole 101 and the first sound guiding hole 103) and the second sound guiding holes (e.g., the second sound guiding hole 113 and the second sound guiding hole 115) may be arranged on a same side or different sides of a housing of the acoustic output apparatus. For example, the first sound guiding hole 101, the first sound guiding hole 103, the second sound guiding hole 113, and the second sound guiding hole 115 may be arranged on a same side of the housing of the acoustic output apparatus. The four sound guiding holes may be arranged along a straight line or multiple straight lines on the housing. As shown in FIG. 5A or FIG. 5B, the first sound guiding holes 101 and the first sound guiding holes 103 may be arranged at intervals along a first direction, and the second sound guiding holes 113 and the second sound guiding holes 115 may be arranged at intervals along a second direction. The first direction may be parallel to the second direction. In some alternative embodiments, the first direction and the second direction may be any suitable directions.

In some embodiments, when the user wears the acoustic output apparatus, the position of a sound guiding hole and the ear of the user may satisfy a specific relationship. For example, a listening position (i.e., the ear of the user) may be taken as an apex. Further, an included angle formed by the first sound guiding hole 101, the first sound guiding hole 103, and the listening position (i.e., an included angle formed by a vector from the listening position to the first sound guiding hole 101 and a vector from the listening position to the first sound guiding hole 103) may not be greater than 150 degrees. An included angle between the second sound guiding hole 113, the second sound guiding hole 115, and the listening position (i.e., an included angle formed by a vector from the listening position to the second sound guiding hole 113 and a vector from the listening position to the second sound guiding hole 115) may not be less than 0 degrees. Preferably, the included angle formed by the first sound guiding hole 101, the first sound guiding hole 103, and the listening position may not be greater than 100 degrees, and the included angle formed by the second sound guiding hole 113, the second sound guiding hole 115, and the listening position may not be less than 10 degrees. More preferably, the included angle formed by the first sound guiding hole 101, the first sound guiding hole 103, and the listening position may not be greater than 90 degrees, and the included angle formed by the second sound guiding hole 113, the second sound guiding hole 115, and the listening position may not be less than 15 degrees. More preferably, the included angle formed by the first sound guiding hole 101, the first sound guiding hole 103, and the listening position may not be greater than 60 degrees, and the included angle formed by the second sound guiding hole 113, the second sound guiding hole 115, and the listening position may not be less than 20 degrees. More preferably, the included angle formed by the first sound guiding hole 101, the first sound guiding hole 103, and the listening position may not be greater than 45 degrees, and the included angle formed by the second sound guiding hole 113, the second sound guiding hole 115, and the listening position may not be less than 25 degrees. More preferably, the included angle formed by the first sound guiding hole 101, the first sound guiding hole 103, and the listening position may not be greater than 30 degrees, and the included angle formed by the second sound guiding hole 113, the second sound guiding hole 115, and the listening position may not be less than 30 degrees. More descriptions regarding the relationship between the position of a sound guiding hole and the listening position may be found elsewhere in the present disclosure (e.g., FIG. 6 and the descriptions thereof).

It should be understood that a sound guiding hole may be arranged at any suitable position of the acoustic output apparatus, which may not be limited herein. For example, the first sound guiding hole 101 may be arranged at a position closer to the ear of the user relative to the first sound guiding hole 103, and the second sound guiding hole 113 may be arranged at a position closer to the ear of the user relative to the second sound guiding hole 115. As another example, the second sound guiding hole 113 and the second sound guiding hole 115 may be arranged at positions closer to the ear of the user relative to the first sound guiding hole 101 and the first sound guiding hole 103. In some embodiments, the first sound guiding hole 101 and/or the second sound guiding hole 113 may be arranged on a side of the housing of the acoustic output apparatus facing the ear of the user. The first sound guiding hole 103 and/or the second sound guiding hole 115 may be arranged on a side of the housing of the acoustic output apparatus away from the ear of the user.

In some embodiments, sounds output by the first set of two point sources through the first sound guiding hole 101 and the first sound guiding hole 103 may have a first phase difference. Sounds output by the second set of two point sources through the second sound guiding hole 113 and the second sound guiding hole 115 may have a second phase difference. In some embodiments, an absolute value of the first phase difference may be within a range of 160 degrees to 180 degrees, and an absolute value of the second phase difference may be within a range of 160 degrees to 180 degrees. Preferably, the first phase difference and the second phase difference may both be 180 degrees. For illustration purposes, "+" and "−" may be used to represent sounds with different phases. As used herein, "+" may represent a normal phase sound (or referred to as a positive phase sound), and "−" may represent a reverse phase sound. In some embodiments, a phase difference between the normal phase sound and the reverse phase sound may be 180 degrees. For example, as shown in FIG. 5A, the acoustic output apparatus 100 may output a sound with a normal phase through the first sound guiding hole 101 and a sound with a reverse phase through the first sound guiding hole 103. The acoustic output apparatus 100 may output a sound with a normal phase through the second sound guiding hole 113 and a sound with a reverse phase through the second sound guiding hole 115.

In some embodiments, a sound output from a first sound guiding hole of the plurality of first sound guiding holes closer from the ear of the user (i.e., a near-ear point source in the first set of two point sources) and a sound output from a second sound guiding hole of the plurality of second sound guiding holes closer from the ear of the user (i.e., a near-ear point source in the second set of two point sources) may have a third phase difference. In some embodiments, a value of the third phase difference may be zero. For example, as shown in FIG. 5A, the acoustic output apparatus 100 may output the sound with the normal phase through the first sound guiding hole 101 (i.e., the near-ear point source of the first set of two point sources), and output the sound with the normal phase through the second sound guiding hole 113 (i.e., the near-ear point source of the second set of two point sources). The two sounds output by the first sound guiding hole 101 and the second sound guiding hole 113 may have a same phase or an approximately same phase (e.g., an absolute value of a phase difference between the two sounds may be within a range of 0 degrees to 10 degrees). The acoustic output apparatus 100 may output the sound with the reverse phase through the first sound guiding hole 103, and output the sound with the reverse phase through the second sound guiding hole 115. The two sounds output by the first sound guiding hole 103 and the second sound guiding hole 115 may be opposite in phase (a phase difference may be 180 degrees) to the sounds output by the first sound guiding hole 101 and the second sound guiding hole 113. In some embodiments, an absolute value of the third phase difference may be within a range of 160 degrees to 180 degrees. Preferably, the absolute value of the third phase difference may be 180 degrees. For example, as shown in FIG. 5B, the acoustic output apparatus 200 may output a reverse phase sound through the first sound guiding hole 101 (i.e., the near-ear point source of the first set of two point sources) and a normal phase sound through the second sound guiding hole 113 (i.e., the near-ear point source of the second set of two point sources). A phase difference between the two sound signals (i.e., the reverse phase sound output by the first sound guiding hole 101 and the normal phase sound output by the second sound guiding hole 113) may be 180 degrees. The acoustic output apparatus 200 may output a normal phase sound through the first sound guiding hole 103. A phase of the normal phase sound output by the first sound guiding hole 103 may be opposite (a phase difference may be 180 degrees) to a phase of the reverse phase sound output by the first sound guiding hole 101. The acoustic output apparatus 200 may output a reverse phase sound through the second sound guiding hole 115. A phase of the reverse phase sound output by the second sound guiding hole 115 may be opposite (a phase difference may be 180 degrees) to a phase of the normal phase sound output by the first sound guiding hole 113.

Further, an arrangement of the sound guiding holes on the acoustic output apparatus may affect sound transmission of the acoustic output apparatus in different directions. In some embodiments, a connection line between a first sound guiding hole of the plurality of first sound guiding holes farther from the ear of the user (i.e., a far-ear point source of the first set of two point sources) and a second sound guiding hole of the plurality of second sound guiding holes closer from the ear of the user (i.e., a near-ear point source of the second set of two point sources) may point to an area where the ear of the user is located. For example, in FIG. 5A and/or FIG. 5B, a connection line (the dashed line in the figure) between the first sound guiding hole 103 (i.e., the far-ear point source of the first set of two point sources) and the second sound guiding hole 113 (i.e., the near-ear point source of the second set of two point sources) may point to the ear E of the user or an area where the ear E is located (i.e., an area where the listening position is located). In such cases, a sound pressure of the sound transmitted by the acoustic output apparatus along a direction of the dashed line (i.e., a direction toward the ear E of the user) may be higher than sound pressures of sounds transmitted along other directions (e.g., a direction perpendicular to the dashed line). In some embodiments, a first included angle between the connection line (e.g., the dashed line in FIG. 5A and/or FIG. 5B) and a connection line of the plurality of second sound guiding holes (e.g., the second sound guiding holes 113 and 115) (i.e., an included angle between a vector from the far-ear point source of the first set of two point sources pointing to the near-ear point source of the first set of two point sources and a vector from the far-ear point source of the first set of two point sources pointing to the near-ear point source of the second set of two point sources) may not be greater than 90 degrees. In some embodiments, a second included angle between the connection line (e.g., the dashed line in FIG. 5A and/or FIG. 5B) and a connection line of the plurality second sound guiding holes (e.g., the second sound guiding holes 113 and 115) (i.e., an included angle between a vector from the near-ear point source of the second set of two point sources pointing to the far-ear point source of the second set of two point sources and a vector from the near-ear point source of the second set of two point sources pointing to the far-ear point source of the first set of two point sources) may be not greater than 90 degrees. Preferably, the first included angle and/or the second included angle may not be greater than 70 degrees. More preferably, the first included angle and/or the second included angle may not be greater than 60 degrees. More preferably, the first included angle and/or the second included angle may not be greater than 45 degrees. More preferably, the first included angle and/or the second included angle may not be greater than 30 degrees.

For illustration purposes, in FIG. 5A, sounds output by the two near-ear point sources of the four point sources may have a same phase and sounds output by the two far-ear point sources may have a same phase, which may be referred to as Mode 1. In FIG. 5B, sounds output by the two near-ear point sources of the four point sources may have a reverse phase, and sounds output by the two far-ear point sources may have a reverse phase, which may be referred to as Mode 2. In some embodiments, Mode 2 and Mode 1 may have different effects of reducing the leaked sound. More descriptions regarding the ability to reduce the leaked sound of the acoustic output apparatus including the four point sources may be found elsewhere in the present disclosure (e.g., FIG. 8 and the descriptions thereof).

In some embodiments, the acoustic output apparatus may control phases of sounds output by different sound guiding holes, respectively. For example, if the first sound guiding hole 101 and the first sound guiding hole 103 output sounds generated by the first acoustic driver, and the second sound guiding hole 113 and the second sound guiding hole 115 output sounds generated by the second acoustic driver, the acoustic output apparatus may adjust phases of electrical signals input into the two acoustic drivers, such that sounds output by the four sound guiding holes may be switched between mode 1 and mode 2.

In some embodiments, the acoustic output apparatus (e.g., the acoustic output apparatus 100, the acoustic output apparatus 200) may include a controller. The controller may be used to control a frequency range of the sounds output by the first acoustic driver or the second acoustic driver. For example, the controller may control the first two point sources and the second two point sources to output sounds in a same frequency range. In some embodiments, the same frequency range may be any suitable value. Merely by way of example, the same frequency range may include at least a portion of a full frequency range of the acoustic output apparatus. In some embodiments, the same frequency range may not be less than 20 Hz. Preferably, the same frequency range may not be less than 80 Hz. More preferably, the same frequency range may not be less than 100 Hz. More preferably, the same frequency range may not be greater than 20 kHz. More preferably, the same frequency range may not be greater than 10 kHz. More preferably, the same frequency range may not be greater than 5 kHz. In some embodiments, the same frequency range may be within a range from 100 Hz to 3 kHz. Preferably, the same frequency range may be within a range from 1000 Hz to 2 kHz.

Additionally or alternatively, the controller may control the first set of two point sources to output a sound in a first frequency range and the second set of two point sources to output a sound in a second frequency range. In some embodiments, the first frequency range and the second frequency range may overlap. The second frequency range may include frequencies higher than the first frequency range. For example, the first frequency range may include frequencies below 650 Hz and the second frequency range may include frequencies above 1000 Hz. The first frequency range may refer to frequencies lower than a first frequency threshold (in such case, the first set of two point sources may also be referred to as low-frequency two point sources). The second frequency range may refer to frequencies higher than a second frequency threshold (in such case, the second set of two point sources may also be referred to as high-frequency two point sources). The first frequency threshold may be higher than the second frequency threshold. In some embodiments, the first frequency threshold may not be less than 100 Hz, the second frequency threshold may not be greater than 10 kHz, and the first frequency threshold may be higher than the second frequency threshold. Preferably, the first frequency threshold may not be less than 650 Hz, the second frequency threshold may not be greater than 8 kHz, and the first frequency threshold may be higher than the second frequency threshold. More preferably, the first frequency threshold may not be less than 1 kHz, the second frequency threshold may not be greater than 5 kHz, and the first frequency threshold may be higher than the second frequency threshold. More preferably, the first threshold value may not be less than 2 kHz, and the second frequency threshold value may not be greater than 1 kHz.

In some embodiments, the first frequency range may be a portion of the second frequency range. Alternatively, the second frequency range may be a portion of the first frequency range. For example, the first frequency range may be a low-frequency range (e.g., less than 650 Hz) and the second frequency range may be a full-frequency range (e.g., a range covering low and high frequencies).

It should be noted that the first frequency threshold and the second frequency threshold may be flexibly set according to different conditions, which may not be limited herein.

Due to the overlap between the first frequency range and the second frequency range, the sound output by the first set of two point sources and the sound output by the second set of two point sources may interact in the overlapping frequency range, such that the acoustic output apparatus may have a strong ability to reduce the leaked sound.

In some embodiments, an acoustic driver may include a transducer. The transducer may include, but not be limited to, a transducer of a gas-conducting acoustic output apparatus, a transducer of a bone-conducting acoustic output apparatus, a hydroacoustic transducer, an ultrasonic transducer, or the like, or any combination thereof. In some embodiments, a working principle of the transducer may include, but not be limited to, a moving coil type, a moving iron type, a piezoelectric type, an electrostatic type, a magneto strictive type, or the like, or any combination thereof.

In some embodiments, the acoustic output apparatus may include transducers with different properties or different counts of transducers. For example, the first acoustic driver may include a first transducer that forms the first set of two point sources, and the second acoustic driver may include a second transducer that forms the second set of two point sources. Specifically, the first transducer may include a vibration diaphragm. When the vibration diaphragm vibrates, sounds may be emitted from front and rear sides of the vibration diaphragm, respectively. The front side of the vibration diaphragm in the acoustic output apparatus may be provided with a front chamber for transmitting sound. The front chamber may be acoustically coupled with a sound guiding hole (e.g., the first sound guiding hole 101). The sound on the front side of the vibration diaphragm may be outputted from the sound guiding hole through the front chamber and further spread out. The rear side of the vibration diaphragm in the acoustic output apparatus may be provided with a back chamber for transmitting sound. The back chamber may be acoustically coupled with another sound guiding hole (e.g., the first sound guiding hole 103). The sound on the rear side of the vibration diaphragm may be outputted from the another sound guiding hole through the back chamber and further spread out. It should be noted that when the vibration diaphragm is vibrating, the front side and the rear side of the vibration diaphragm may respectively generate sounds with opposite phases. In such cases, by designing structures of the front chamber and the back chamber, the sound guiding holes (e.g., the first sound guiding hole 101 and the first sound guiding hole 103) may output sounds with a specific phase relationship (e.g., opposite phases). The second transducer may output sounds with a specific phase relationship from sound guiding holes (e.g., the second sound guiding hole 113 and the second sound guiding hole 115) in a similar manner. In some embodiments, the first transducer and the second transducer may have a same frequency response characteristic. The controller may input electrical signals including different sound components into the first transducer and the second transducer, such that the first transducer may generate sounds in the first frequency range and the second transducer may generate sounds in the second frequency range. In some embodiments, the first transducer and the second transducer may have different frequency response characteristics. For example, the first transducer may be a low-frequency speaker with low-pass characteristics and the second transducer may be a high-frequency speaker with high-pass or band-pass characteristics. In such cases, the controller may input a same electrical signal into the first transducer and the second transducer. The first transducer and the second transducer may generate sounds in different frequency ranges, respectively. For example, the first set of two point sources corresponding to the first transducer may be low-frequency two point sources, which may output a low-frequency sound signal in the first frequency range. The second set of two point sources corresponding to the second transducer may be high-frequency two point sources, which may output a high-frequency sound signal in the second frequency range.

In some embodiments, the acoustic output apparatus may include four transducers (e.g., a third transducer, a fourth transducer, a fifth transducer, and a sixth transducer). The four transducers may output sounds from sound guiding holes corresponding to the four transducers. For example, the first acoustic driver may include the third transducer and the fourth transducer. The third transducer may output a sound through the first sound guiding hole 101 and the fourth transducer may output a sound through the first sound guiding hole 103. The second acoustic driver may include the fifth transducer and the sixth transducer. The fifth transducer may output a sound through the second sound guiding hole 113 and the sixth transducer may output a sound through the second sound guiding hole 115. In order to satisfy the phase relationship in FIG. 5A/5B, the third transducer and the fourth transducer may respectively output sounds with opposite phases under the drive of opposite electrical signals. The fourth transducer and the fifth transducer may also output sounds with opposite phases under the drive of opposite electrical signals. In some embodiments, the fourth transducer and the fifth transducer may also output sounds with opposite phases (or a same phase) to form Mode 1 in FIG. 5A (or Mode 2 in FIG. 5B). In some embodiments, the third transducer, the fourth transducer, the fifth transducer, and the sixth transducer may have the same or different frequency response characteristics. For example, the third transducer and the fourth transducer may be a low-frequency speaker. The fifth transducer and the sixth transducer may be a high-frequency speaker. In such cases, the first set of two point sources may be low-frequency two point sources, which may output a low-frequency sound signal in the first frequency range. The second set of two point sources may be high-frequency two point sources, which may output a high-frequency sound signal in the second frequency range.

In some embodiments, the acoustic output apparatus may include a support structure. The support structure may be configured to support an acoustic driver, such that when the user wears the acoustic output apparatus, the sound guiding hole(s) connected to the acoustic driver may be located away from the ear of the user. In some embodiments, the support structure may include a housing for encapsulating the acoustic driver. The housing may include various materials, such as plastic, metal, cloth tape, etc. In some embodiments, one or more sound guiding holes (e.g., the first sound guiding hole 101, the first sound guiding hole 103, the second sound guiding hole 113, and the second sound guiding hole 115) may be disposed on the housing.

It should be noted that the above descriptions of the acoustic output apparatus are merely for illustration purposes and not intended to limit the present disclosure. It should be understood that, for those skilled in the art, after understanding the principle of the device, it is possible to arbitrarily combine various modules, or form a subsystem to connect to other modules without departing from the principle. For example, the acoustic output apparatus may control a frequency of the sound output by an acoustic driver through an electronic frequency division, a transducer frequency division, an acoustic path frequency division, or the like, or any combination thereof.

Figure 6:
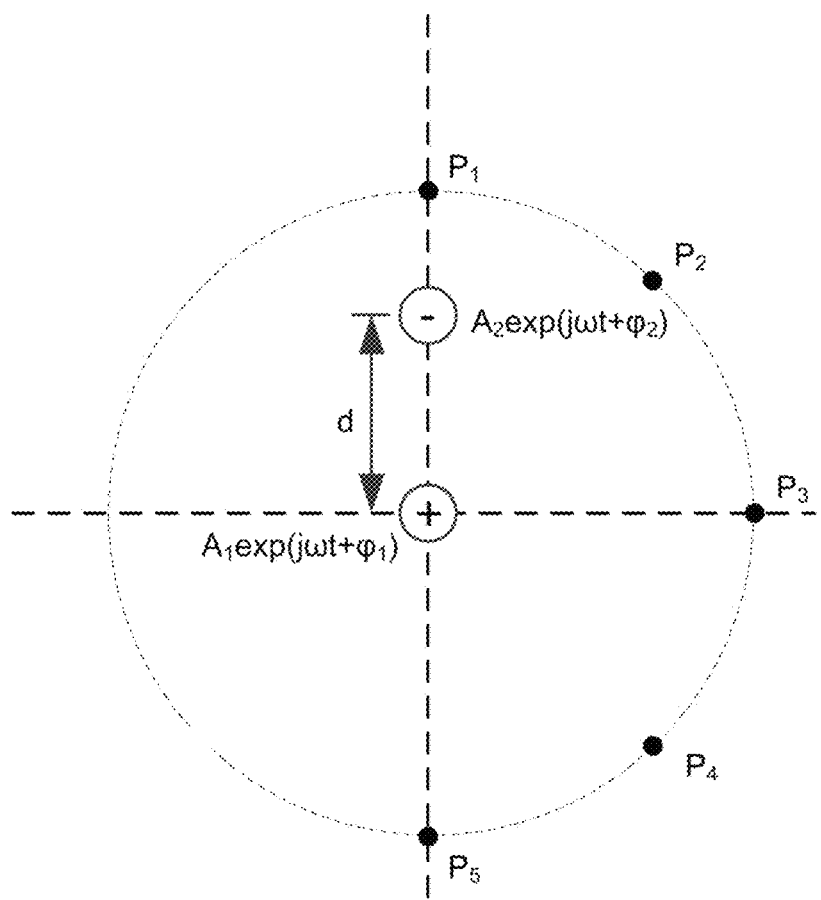
FIG. 6 is a schematic diagram illustrating two point sources and listening positions according to some embodiments of the present disclosure.

FIG. 6 is a schematic diagram illustrating two point sources and listening positions according to some embodiments of the present disclosure.

In some embodiments, two point sources (i.e., sound guiding holes) may be arranged at different positions relative to a listening position, such that an acoustic output apparatus may generate different near-field sound effects. FIG. 6 illustrates a relationship between the two point sources and the listening position. As used herein, "+" and "−" may represent point sources that output sounds with opposite phases, respectively. "+" may represent a normal phase sound, and "−" may represent a reverse phase sound. d may represent a distance between two point sources. $P_n$ may represent a listening position. In addition, for the convenience of comparison, distances between one of the two point sources in FIG. 6 (e.g., a point source with the normal phase in FIG. 6) and listening positions $P_1$ to $P_5$ may be the same, that is, the listening positions may be equivalent to being evenly distributed on a circle centered at the point source. The listening positions $P_1$ and $P_5$ may be located on a connection line of the two point sources. A connection line of the listening position $P_3$ and the point source with the normal phase may be perpendicular to the connection line of the two point sources. Since a sound field formed by the two point sources is symmetrical with respect to the connection line of the two point sources, for simplicity, only the sound field on one side (e.g., a semicircle on the right in FIG. 6) of a symmetry axis (i.e., the connection line of the two point sources) may be analyzed in FIG. 6. For illustration purposes, FIG. 6 and FIG. 7 may be combined to describe a relationship between a volume of the sound heard by the user of the two point sources and the listening position. A plurality of points on a spherical surface centered by a center point of the two point sources with a radius of r (for example, 40 centimeters) may be identified, and an average value of amplitudes of the sound pressure at the plurality of points may be determined as the value of the sound leakage. In order to better reflect relative variations of the sound heard by the user and the leaked sound, a normalization may be performed on the sound heard by the user and the leaked sound in FIG. 7.

Figure 7:
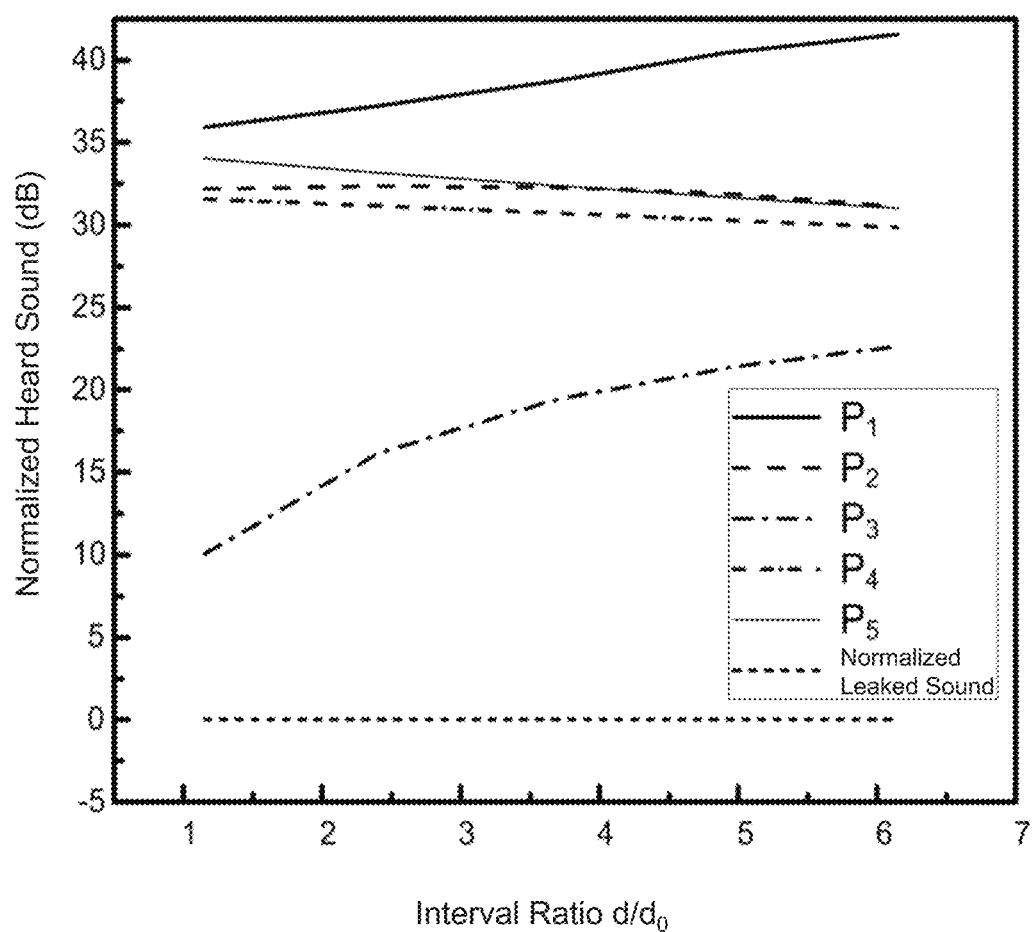
FIG. 7 is a schematic diagram illustrating a variation of a volume of a sound heard by a user of two point sources with different distances along with a distance of the two point sources according to some embodiments of the present disclosure.

The two point sources corresponding to FIG. 6 and FIG. 7 may have a same amplitude and opposite phases. In the case of a certain sound frequency, if angles between the two point sources and the listening position are different, the volume of the sound heard by the user generated by one of the two point source and the volume of the sound heard by the user generated by the other one of the two point source may be different (different normalized volume). When the difference between a distance from one of the two point sources to the listening position and a distance from the other one of the two point source to the listening point is large, the acoustic output apparatus may generate a sound heard by the user with a larger volume. As shown in FIG. 7, when the listening position is at $P_1$, since a distance between a point source of the two point sources outputting a reverse phase sound and the listening position $P_1$ is shorter, a cancellation between the normal phase sound and the reverse phase sound output by the two point sources at $P_1$ may be very small. Therefore, the two point sources may have a maximum volume of the sound heard by the user. Similarly, for the listening positions $P_2$, $P_4$, and $P_5$, since there is a certain difference between a distance from the point source outputting the normal phase sound to the listening position and a distance from the point source outputting the reverse phase sound to the listening position, a cancellation between the normal phase sound and reverse phase sound output by the two point sources may be also small. Therefore, the two point sources may have a relatively large volume of the sound heard by the user. When the difference between the distances of the two point sources and the listening position is small, the acoustic output apparatus may generate a relatively low volume of the sound heard by the user. For example, in FIG. 7, when the listening position is at $P_5$, since a difference between a distance from the point source outputting the normal phase sound to the listening position $P_3$ and a distance from the point source outputting the reverse phase sound to the listening position $P_5$ is relatively small, an effect of a cancellation of opposite phase sounds may be relatively obvious. Therefore, the two point sources may have a relatively low volume of the sound heard by the user.

According to the above content, when a position relationship between the two point sources and the listening position satisfies a certain condition, the acoustic output apparatus may have a higher volume of the sound heard by the user. In practical applications, a position of the sound guiding holes may be adjusted to increase the volume of the near-field sound generated by the two point sources. In some embodiments, a spatial included angle between a spatial connection line from one of the two sound guiding holes of the two point sources to listening position and a spatial connection line from the other of the two sound guiding holes to listening position may not be greater than 180 degrees. Preferably, the spatial included angle may not be greater than 90 degrees. More Preferably, the spatial included angle may not be greater than 45 degrees. More Preferably, the spatial included angle may not be greater than 30 degrees. The spatial included angle may be an included angle formed by the spatial connection line from one of the sound guiding holes to the listening position and the spatial connection line from the other of the sound guiding holes to listening position while taking the listening position as a vertex. In some embodiments, if the four point sources on the acoustic output apparatus include a set of high-frequency two point sources and a set of low-frequency two point sources, the four sound guiding holes of the two sets of two point sources may be set in different manners. For example, in order to increase the volume of the near-field sound, the two sound guiding holes of the low-frequency (or high-frequency) two point sources may be set in a manner in FIG. 6, and the listening position (i.e., the ear of the user) may be located at $P_1$ or $P_5$. Meanwhile, when the user wears the acoustic output apparatus, the connection line of the two sound guiding holes of the low-frequency (or high-frequency) two point sources may point to a direction of the ear of the user.

In some embodiments, when the distance between the two point sources changes or the position relationship between the two point sources and the listening position changes, a variation of the volume of the sound heard by the user may be changed. For example, when the listening position is at $P_1$ and $P_3$ in FIG. 6 (or nearby positions of the $P_1$ and $P_5$, or positions axisymmetrical to the $P_1$ and $P_5$ with respect to the connection line of the two point sources), as the distance d between the two point sources increases, a volume of the normalized sound heard by the user may be increased. Meanwhile, an increase in the volume of the sound heard by the user may be greater than an increase in the volume of the leaked sound. In practical applications, the volume of the sound heard by the user may be increased by increasing the distance d between the two point sources while the volume of the leaked sound may not significantly increase. In particular, when the listening position is at $P_1$, the volume of the sound heard by the user is relatively large. In such case, when the distance d is increased, the volume of the leaked sound may be increased accordingly. However, the increase in the volume of the leaked sound may not be greater than the increase in the volume of the sound heard by the user. When the listening position is at $P_2$, $P_4$, and $P_5$ (or nearby positions of the $P_2$, $P_4$, and $P_5$, or positions axisymmetrical to the $P_2$, $P_4$, and $P_5$ with respect to the connection line of the two point sources), as the distance d between the two point sources increases, the volume of the normalized sound heard by the user may be decreased. In practical applications, an effect of reducing the leaked sound may be enhanced by decreasing the distance d between the two point sources. In particular, when the distance d between the two point sources is decreased, the volume of the sound heard by the user may be also decreased. However, the decrease in the volume of the sound heard by the user may not be less than the decrease in the volume of the leaked sound.

According to the above descriptions, the volume of the sound heard by the user of the two point sources and the ability to reduce the leaked sound may be improved by adjusting the distance between the two point sources and the positional relationship between the two point sources and the listening position. Preferably, when the listening position is at $P_1$ and $P_3$ (or nearby positions of the $P_1$ and $P_5$, or positions axisymmetrical to the $P_1$ and $P_3$ with respect to the connection line of the two point sources), the distance d between the two point sources may be increased to obtain a larger volume of the sound heard by the user. More preferably, when the listening position is at $P_1$ (or nearby position of the $P_1$, and a position axisymmetrical to the $P_1$ with respect to the connection line of the two point sources), the distance d between the two point sources may be increased to obtain a larger volume of the sound heard by the user. More preferably, when the listening position is at $P_2$, $P_4$, and $P_5$ (or nearby positions of the $P_2$, $P_4$, and $P_5$, or positions axisymmetrical to the $P_2$, $P_4$, and $P_5$ with respect to the connection line of the two point sources), the distance d of the two point sources may be increased to obtain a better ability to reduce the leaked sound.

It should be noted that the above descriptions of the listening position of the acoustic output apparatus are merely for illustration purposes and not intended to limit the present disclosure. It should be understood that, for those skilled in the art, after understanding the principle of the acoustic output apparatus, the sound guiding holes of the two point sources or the four point sources formed on the acoustic output apparatus may be reasonably arranged to increase the volume of the near-field sound and reduce the volume of the far-field leakage of the acoustic output apparatus without departing from the principle.

Figure 8A:
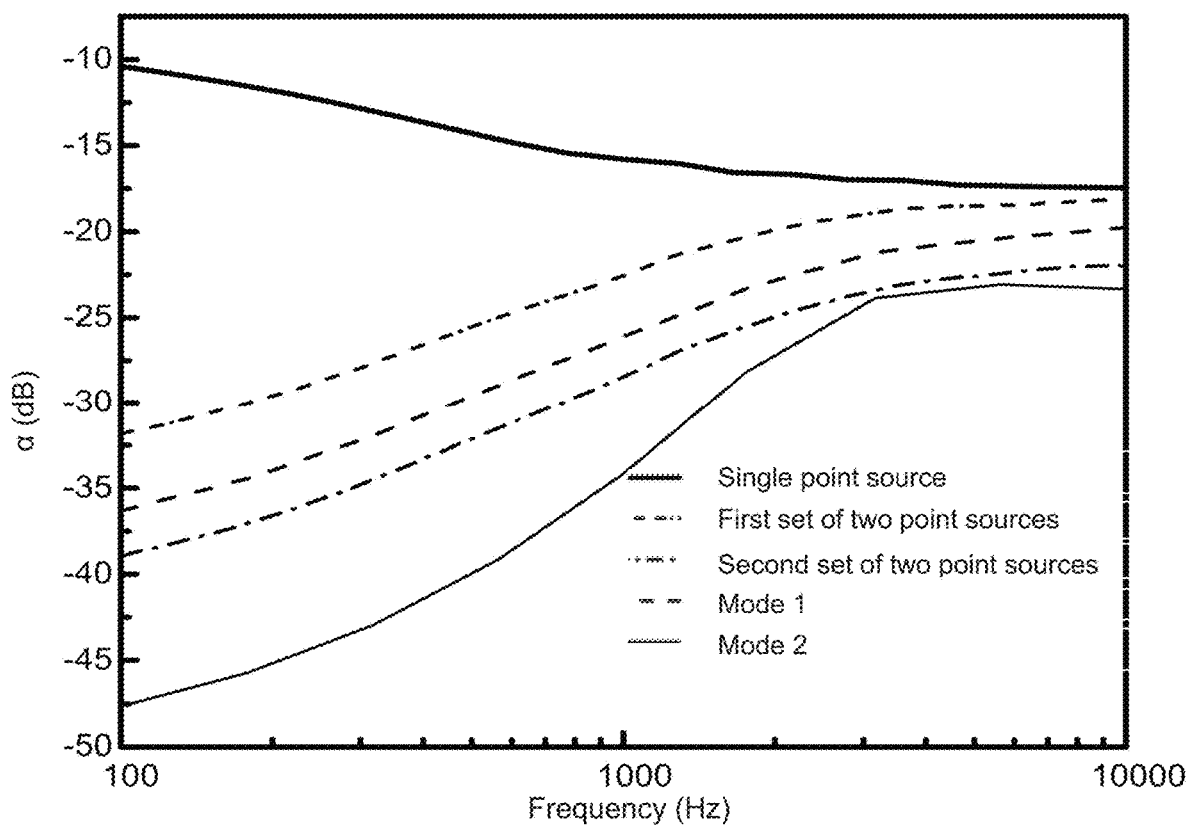
FIGS. 8A-8B are schematic diagrams illustrating a variation of a leaked sound under a combined action of two sets of two point sources according to some embodiments of the present disclosure.
Figure 8B:
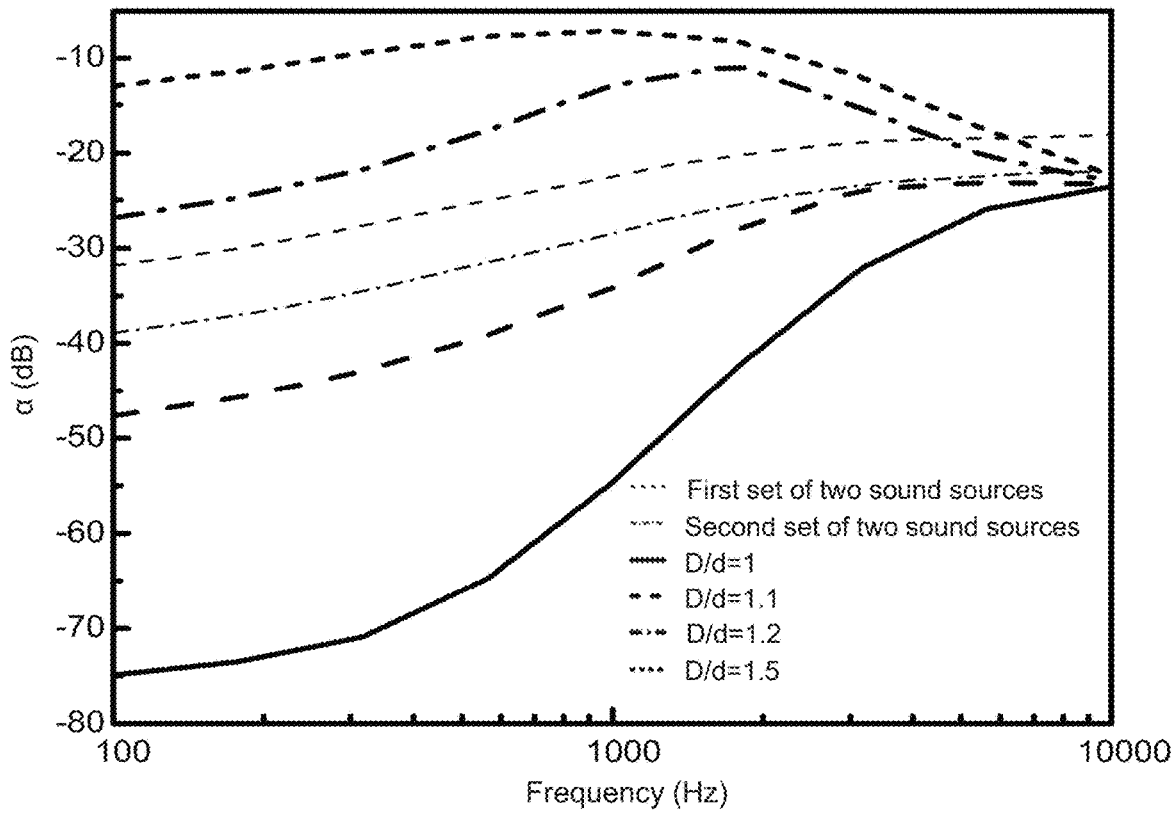

FIGS. 8A-8B are schematic diagrams illustrating a variation of a leaked sound under a combined action of two sets of two point sources according to some embodiments of the present disclosure.

As shown in FIG. 8A, using two point sources may obtain a stronger ability to reduce the leaked sound than using a single point source. Preferably, two sets of two point sources (e.g., the first set of two point sources and the second set of two point sources shown in FIGS. 5A and 5B) may be set to output sounds with opposite phases. Further, near-ear point sources in the two sets of two point sources may output sounds with opposite phases (i.e., Mode 2 in 5B), which may achieve a stronger ability to reduce the leaked sound than using one set of two point sources (e.g., the first set of two point sources or the second set of two point sources). Merely for illustration purposes, FIG. 8A illustrates a leaked sound of the two sets of two point sources with an overlapping frequency within a range of 100 Hz to 10000 Hz. Specifically, in the overlapping frequency range, it may be considered that a far-field leakage generated by the second set of two point sources in the four point sources and a far-field leakage generated by the first set of two point sources may interfere with each other, such that the far-field leakage generated by the first set of two point sources or the second set of two point sources may be reduced. As shown in FIG. 8A, the leaked sound corresponding to Mode 2 is lower than the leaked sound corresponding to the first set of two point sources or the second set of two point sources, which shows that the leaked sound generated by the two sets of two point sources may be canceled by the interference. In Mode 1 (i.e., the sounds output by near-ear sound sources of the two sets of two point sources have a same phase), the ability to reduce the leaked sound of the acoustic output apparatus may be between that of the first set of two point sources and the second set of two point sources. In such cases, it may be considered that the far-field leakage generated by the second set of two point sources of the four point sources and the far-field leakage generated by the first set of two point sources may interface with each other, such that the far-field leakage generated by the first set of two point sources may be reduced. As shown in FIG. 8A, the leaked sound corresponding to Mode 1 is lower than the leaked sound corresponding to the first set of two point sources, which shows that the leaked sound generated by the second set of two point sources and the leaked sound generated by the first set of two point sources may interface with each other to suppress the leaked sound only generated by the first set of two point sources.

FIG. 8B shows a curve of the reduction of the leaked sound when the four point sources (two sets of two point sources) are set according to Mode 2 and a ratio of a distance between one set of two point sources in the four point sources and a distance between the other set of two point sources in the four point sources changes. When the ratio of a distance $d_1$ of the first set of two point sources and a distance $d_2$ of the second set of two point sources is within a certain range, the four point sources may achieve a strong ability to reduce the leaked sound. For example, as shown in FIG. 8B, when the ratio $d_1/d_2$ is 1, 1.1, 1.2, or 1.5, the four point sources may have a relatively strong ability to reduce the leaked sound (the parameter a (also referred to as an index of the leaked sound) is relatively low). When the ratio $d_1/d_2$ is 1 or 1.1, the four point sources may have a stronger ability to reduce the leaked sound than a single set of two point sources (e.g., the first set of two point sources or the second set of two point sources). Therefore, for an actual acoustic output apparatus, the ratio $d_1/d_2$ may be set to be within a certain range, such that the four point sources (two sets of two point sources) may have a stronger ability to reduce the leaked sound. Preferably, the range of the ratio $d_1/d_2$ may be between 1 and 1.5. More preferably, the range of the ratio $d_1/d_2$ may be between 1 and 1.2. More preferably, the range of the ratio $d_1/d_2$ may be between 1 and 1.1.

Figure 9:
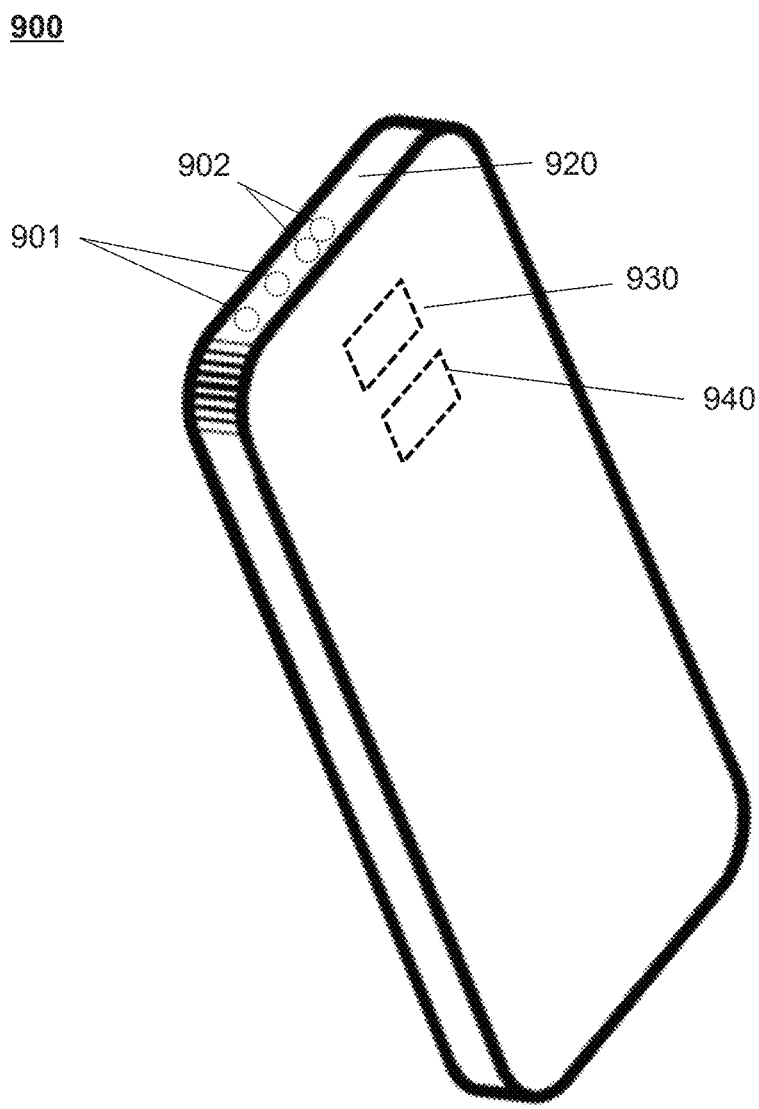
FIG. 9 is a schematic diagram illustrating a phone having a plurality of sound guiding holes according to some embodiments of the present disclosure.

It should be noted that the descriptions of the present disclosure may not limit an actual use scenario of the acoustic output apparatus. The acoustic output apparatus may be any apparatus for outputting sounds or a portion of an apparatus for outputting sounds. For example, the acoustic output apparatus may be applied to a phone. FIG. 9 is a schematic diagram illustrating a phone having a plurality of sound guiding holes according to some embodiments of the present disclosure. As shown in FIG. 9, a plurality of sound guiding holes described elsewhere in the present disclosure may be arranged on a top portion 920 (i.e., an upper end "perpendicular" to a display of the phone 900) of a phone 900. Merely by way of example, sound guiding holes 901 may form a set of two point sources (or an array of point sources) for outputting sounds in a first frequency range, and sound guiding holes 902 may from a set of two point sources (or an array of point sources) for outputting sounds in a second frequency range. A distance between the sound guiding holes 901 may be greater than a distance between the sound guiding holes 902. A first acoustic driver 930 and a second acoustic driver 940 may be provided inside a housing of the phone 900. The sounds in a first frequency range generated by the first acoustic driver 930 may be transmitted outward through the sound guiding holes 901. The sounds in a second frequency range generated by the second acoustic driver 940 may be transmitted outward through the sound guiding holes 902. In some embodiments, the sound guiding holes 901 and the sound guiding holes 902 may output sounds in the manner described elsewhere in the present disclosure (e.g., outputting sounds according to the manner as described in connection with FIG. 5A or 5B). When a user places the sound guiding holes 901 and 902 near an ear to receive voice information, in an overlapping frequency range of the first frequency range and the second frequency range, the sound guiding holes 901 and 902 may transmit a strong near-field sound to the user and a reduced leaked sound to a surrounding environment. In addition, by arranging the sound guiding holes on the top portion of the phone instead of an upper portion of the display of the phone, a space on a front of the phone may be saved. Therefore, an area of the display of the phone may be further increased and an appearance of the phone more concise and beautiful.

The above descriptions of the sound guiding holes on the phone are merely for illustration purposes. Those skilled in the art may make various modifications to the above structures. The modified structures may be within the protection scope of the present disclosure. For example, all or a portion of the sound guide holes 901 or 902 may also be set at other positions of the phone 900, such as an upper portion of a back of the housing, an upper portion of a side of the housing, etc., which may still ensure that the user may hear a relatively loud volume when receiving voice information while avoiding a leakage of the voice information to the surrounding environment. As another example, the first acoustic driver 930 and/or the second acoustic driver 940 may omitted, and other manners described in the present disclosure may be used to perform a frequency division on the sound output by the phone 900, which may not be repeated herein.

The beneficial effects of the embodiments in the present disclosure may include but are not limited to the following: (1) by setting two sets of two point sources and making each set of two point sources output sounds satisfying a certain condition (e.g., opposite phases), the acoustic output apparatus may have a better sound output effect; (2) by setting two sets of two point sources with different distances, the acoustic output apparatus may have a stronger ability to reduce the leaked sound in a high-frequency band, which may meet requirements for an open acoustic output apparatus; (3) by setting two sets of two point sources, in which the phases of the near-ear point sources in the two sets of two point sources are the same (or opposite), the phases of the far-ear point sources are the same (or opposite), and the phases of the near-ear point source and the far-ear point source in the same set of two point source are opposite, the acoustic output apparatus may have a stronger ability to reduce the leaked sound. It should be noted that different embodiments may have different beneficial effects. In various embodiments, the acoustic output apparatus may have any one or a combination of the benefits exemplified above, and any other beneficial effects that can be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Per, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output apparatus, comprising:
  a first acoustic driver for outputting sounds within a first frequency range via a plurality of first sound guiding holes, the sounds output via the plurality of first sound guiding holes radiating to the environment and forming a leaked sound;
  a second acoustic driver for outputting sounds within a second frequency range via a plurality of second sound guiding holes, the second frequency range and the first frequency range overlapping; and
  a support structure configured to support the first acoustic driver and the second acoustic driver such that the plurality of first sound guiding holes and the plurality of second sound guiding holes are located at positions away from an ear of a user, wherein
    the plurality of first sound guiding holes include a far-ear sound guiding hole farther from the ear of the user among the plurality of first sound guiding holes,
    the plurality of second sound guiding holes include a near-ear sound guiding hole closer to the ear of the user among the plurality of second sound guiding holes,
    the sounds output via the far-ear sound guiding hole and the near-ear sound guiding hole in an overlapping frequency range between the second frequency range and the first frequency range have a same phase such that the sounds output via the plurality of second sound guiding holes interfere with the leaked sound in the overlapping frequency range, and
    the interference reduces the leaked sound.

2. The acoustic output apparatus of claim 1, wherein
  the sounds output via the plurality of first sound guiding holes have a first phase difference,
  the sounds output via the plurality of second sound guiding holes have a second phase difference,
  an absolute value of the first phase difference is within a range from 160 degrees to 180 degrees, and
  an absolute value of the second phase difference is within a range from 160 degrees to 180 degrees.

3. The acoustic output apparatus of claim 2, wherein
  a pair of first sound guiding holes of the plurality of first sound guiding holes are spaced from each other by a first distance,
  a pair of second sound guiding holes of the plurality of second sound guiding holes are spaced from each other by a second distance, and
  the first distance is greater than the second distance.

4. The acoustic output apparatus of claim 3, wherein the first distance is at least 1.1 times more than the second distance.

5. The acoustic output apparatus of claim 1, wherein
a connection line between the far-ear sound guiding hole and the near-ear sound guiding hole is directed to an area where the ear of the user is located.

6. The acoustic output apparatus of claim 5, wherein an included angle between the connection line and a connection line of the plurality of first sound guiding holes is not greater than 90 degrees.

7. The acoustic output apparatus of claim 5, wherein an included angle between the connection line and a connection line of the plurality of second sound guiding holes is not greater than 90 degrees.

8. The acoustic output apparatus of claim 1, wherein
the plurality of first sound guiding holes include a near-ear sound guiding hole closer to the ear of the user among the plurality of first sound guiding holes,
the plurality of second sound guiding holes include a near-ear sound guiding hole closer to the ear of the user among the plurality of second sound guiding holes, and
a sound output via the near-ear sound guiding hole of the plurality of first sound guiding holes and a sound output via the near-ear sound guiding hole of the plurality of second sound guiding holes have a third phase difference.

9. The acoustic output apparatus of claim 8, wherein
an absolute value of the third phase difference is within a range of 160 degrees to 180 degrees.

10. The acoustic output apparatus of claim 1, wherein the first frequency range includes frequencies lower than 650 Hz and the second frequency range includes frequencies higher than 1000 Hz.

11. The acoustic output apparatus of claim 10, wherein the first frequency range includes frequencies lower than the frequencies in the second frequency range.

12. The acoustic output apparatus of claim 10, wherein the second frequency range includes frequencies higher than the frequencies in the first frequency range.

13. The acoustic output apparatus of claim 1, wherein
the first acoustic driver includes a first transducer for generating the sounds output via the plurality of first sound guiding holes, and
the second acoustic driver includes a second transducer for generating the sounds output via the plurality of second sound guiding holes.

14. The acoustic output apparatus of claim 13, wherein the first transducer and the second transducer have different frequency response characteristics.

15. The acoustic output apparatus of claim 13, wherein the first transducer and the second transducer have the same frequency response characteristic.

16. The acoustic output apparatus of claim 13, wherein
at least one of the first transducer or the second transducer includes a vibration diaphragm, and
when the vibration diaphragm is vibrating, a front side and a rear side of the vibration diaphragm generate sounds with opposite phases.

17. The acoustic output apparatus of claim 16, wherein the front side of the vibration diaphragm is provided with a front chamber for transmitting sound, the front chamber being acoustically coupled with one sound guiding hole of the plurality of first sound guiding holes and the plurality of second sound guiding holes.

18. The acoustic output apparatus of claim 17, wherein the rear side of the vibration diaphragm is provided with a back chamber for transmitting sound, the back chamber being acoustically coupled with another sound guiding hole of the plurality of first sound guiding holes and the plurality of second sound guiding holes.

19. The acoustic output apparatus of claim 1, wherein the first acoustic driver includes a plurality of transducers, each of the plurality of transducers being configured to generate the sound output via one of the plurality of first sound guiding holes.

20. The acoustic output apparatus of claim 1, wherein the acoustic output apparatus further includes a controller configured to control the frequency range of the sounds output by the first acoustic driver and/or the second acoustic driver.

* * * * *